(12) United States Patent
Hosokawa et al.

(10) Patent No.: US 11,231,336 B2
(45) Date of Patent: Jan. 25, 2022

(54) THRUST MEASURING DEVICE

(71) Applicant: Mitsubishi Electric Corporation, Tokyo (JP)

(72) Inventors: Yoshihiro Hosokawa, Tokyo (JP); Takashi Akiyama, Tokyo (JP); Yasushi Horiuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 120 days.

(21) Appl. No.: 16/754,177

(22) PCT Filed: Dec. 4, 2018

(86) PCT No.: PCT/JP2018/044479
§ 371 (c)(1),
(2) Date: Apr. 7, 2020

(87) PCT Pub. No.: WO2019/116957
PCT Pub. Date: Jun. 20, 2019

(65) Prior Publication Data
US 2021/0215558 A1      Jul. 15, 2021

(30) Foreign Application Priority Data
Dec. 15, 2017 (JP) .............................. JP2017-240191

(51) Int. Cl.
*G01L 5/00* (2006.01)
*H02K 11/20* (2016.01)

(52) U.S. Cl.
CPC .......... *G01L 5/0061* (2013.01); *G01L 5/0038* (2013.01); *H02K 11/20* (2016.01)

(58) Field of Classification Search
CPC ...... H02K 41/031; H02K 41/03; H02K 11/20; G01L 5/0061; G01L 5/0038
(Continued)

(56) References Cited

U.S. PATENT DOCUMENTS 7,193,493 B2 * 3/2007 Asano ................ G03F 7/70716
269/8

FOREIGN PATENT DOCUMENTS

EP       0564255      *  3/1993
JP       H02075969 U     6/1990
(Continued)

OTHER PUBLICATIONS

International Search Report (PCT/ISA/210), with translation, and Written Opinion (PCT/ISA/237) dated Jan. 22, 2019, by the Japan Patent Office as the International Searching Authority for International Application No. PCT/JP2018/044479.

*Primary Examiner* — Octavia Hollington
(74) *Attorney, Agent, or Firm* — Buchanan Ingersoll & Rooney PC

(57) ABSTRACT

Provided herein are: a movable part that is provided with coils placed correspondingly to magnets arranged in an arc shape, a pressure sensor, vertical-side hydrostatic pads, and a lateral-side hydrostatic plate and lateral-side hydrostatic pads caused to move in a manner matched to the shape of the magnets; and a stationary part that is provided with a base on which the magnets and vertical-side hydrostatic plates being opposite to the vertical-side hydrostatic pads are placed, a wall on which a lateral-side hydrostatic pad being opposite to the lateral-side hydrostatic plate is placed, a wall on which a lateral-side hydrostatic plate being opposite to the lateral-side hydrostatic pads is placed, and a wall to which an actuator coupled to the pressure sensor through a ball joint.

20 Claims, 11 Drawing Sheets

(58) Field of Classification Search
USPC .................................................. 73/862.381
See application file for complete search history.

(56) References Cited

FOREIGN PATENT DOCUMENTS

| | | | |
|---|---|---|---|
| JP | H08119448 | A | 5/1996 |
| JP | 2000028344 | A | 1/2000 |
| JP | 2001218497 | A | 8/2001 |
| JP | 2004254453 | A | 9/2004 |
| JP | 2017181343 | A | 10/2017 |
| WO | 2015141378 | A1 | 9/2015 |

* cited by examiner

THRUST MEASURING DEVICE

TECHNICAL FIELD

The present application relates to a thrust measuring device for measuring thrust of a linear motor and further for measuring a characteristic of the linear motor from the thrust produced.

BACKGROUND ART

In a linear motor, permanent magnets (magnets) are arranged at intervals in a movement direction of the linear motor. At positions opposite to these permanent magnets, coils are arranged through a gap from the magnets, in the movement direction of the linear motor. Changing the direction of a current caused to flow through the coil makes it possible to switch between N-pole and S-pole in that coil at its portions opposite to permanent magnets. When such switching between N-pole and S-pole is controlled, namely, when the timings are controlled at which the permanent magnets and the coils are attracted to each other and at which they are repelled from each other, the linear motor produces thrust in a movement direction thereof. In the case of causing the linear motor to produce thrust, it doesn't matter for the permanent magnets and the coils which side thereof is the stator side or the movable side. Meanwhile, a linear motor having an iron core in each coil is referred to as a linear motor with core, and a linear motor having no iron core in the coil is referred to as a coreless linear motor. In the case of the linear motor with core, since the iron core is placed at the center of the coil, the magnetic force is strong and thus the thrust of the linear motor is strong; however, pulsation is likely to occur in the thrust of the linear motor under the influence of mutual attraction of the permanent magnets and the coil's cores. In the case of the coreless linear motor, since no iron core is placed in the coil, pulsation is less likely to occur in the thrust of the linear motor; however, the thrust of the linear motor is weak because the magnetic force is weak.

Here, description will be made about the pulsation that may occur in the thrust of the linear motor with core. Pulsation that occurs in the thrust of a linear motor is categorized into two types. One of them is thrust pulsation that occurs due to change in magnetoresistance in response to change in relative position between the coils and the permanent magnets, and it is referred to as cogging thrust (hereinafter may be referred to as cogging). The cogging varies according to the relative position between the coils and the permanent magnets regardless of the current caused to flow through each coil, so that it can be measured by externally changing the relative position between the coils and the permanent magnets in a state in which no current flows through each coil. The other of them is thrust pulsation that occurs due to unstable interaction between the magnetic fluxes by the coils and the magnetic fluxes by the permanent magnets, and it is referred to as a thrust ripple (hereinafter may be referred to as a ripple). The ripple increases in proportion to the current caused to flow through each coil.

With respect to the linear motor with core, pulsation that occurred in the thrust of the linear motor affects control performance thereof, so that various measuring methods for that pulsation have been proposed heretofore. For example, there is a method in which thrust variation is precisely measured in such a manner that the coils of the linear motor are hung using a leaf spring (see, for example, Patent Document 1). Further, there is a method in which the linear motor is installed to a contact-type guide mechanism, such as a bearing mechanism, and the measurement is performed using a force sensor (see, for example, Patent Document 2).

CITATION LIST

Patent Document

Patent Document 1: International Patent Application Publication No. WO2015/141378 (Paragraphs 0008 to 0009; FIG. 1)
Patent Document 2: Japanese Patent Application Laid-open No. 2001-218497 (Paragraph 0010; FIG. 6)

SUMMARY OF THE INVENTION

Problems to be Solved by the Invention

According to the aforementioned methods for measuring the thrust pulsation of the linear motor, it is difficult to precisely measure the cogging and the ripple of a linear motor arranged in an arc shape.

This application has been presented to solve the problem as described above, and an object thereof is to provide a thrust measuring device which is capable of precisely measuring the cogging and the ripple of the linear motor arranged in an arc shape.

Means for Solving the Problems

A thrust measuring device disclosed in this application is characterized by comprising a movable unit and a stationary unit, said movable unit being provided with: movable-side coils or movable-side magnets that are placed correspondingly to stationary-side magnets or stationary-side coils in a linear motor formed in an arc shape; a pressure sensor or a force sensor for measuring thrust of the linear motor; and a first hydrostatic plate and/or a first hydrostatic pad caused to move in a manner matched to a shape of the stationary-side magnets or the stationary-side coils, and said stationary unit being provided with: the stationary-side magnets or the stationary-side coils in the linear motor; a second hydrostatic pad and/or a second hydrostatic plate that is opposite to the first hydrostatic plate and/or the first hydrostatic pad; an actuator coupled through a joint to the pressure sensor or the force sensor, for moving the movable unit in a movement direction thereof; and a position sensor for measuring a position of the movable unit.

In another aspect, it is characterized by comprising a movable unit and a stationary unit, said movable unit being provided with: movable-side coils or movable-side magnets that are placed correspondingly to stationary-side magnets or stationary-side coils in a linear motor formed in an arc shape in horizontal directions; a pressure sensor or a force sensor for measuring thrust of the linear motor; a perpendicular-side hydrostatic pad that holds the movable-side magnets or the movable-side coils at a fixed height; a horizontal-side first hydrostatic plate and/or a horizontal-side first hydrostatic pad that is placed on each of lateral sides of the movable unit and has an arc shape for causing it to move in a manner matched to a shape of the stationary-side magnets or the stationary-side coils, and said stationary unit being provided with: a base on which the stationary-side magnets or the stationary-side coils in the linear motor, and a perpendicular-side hydrostatic plate in a flat-plate shape, that is opposite to the perpendicular-side hydrostatic pad, are placed; first and second walls on each of which a horizontal-side second hydrostatic pad and/or a horizontal-side second hydrostatic plate having an arc shape that is opposite to the horizontal-side first hydrostatic plate and/or the horizontal-side first hydrostatic pad, is placed; and a third wall to which an actuator coupled through a joint to the pressure sensor or the force sensor, for moving the movable unit in a movement direction thereof, and a position sensor for measuring a position of the movable unit, are attached.

In still another aspect, it is characterized by comprising a movable unit and a stationary unit, said movable unit being provided with: movable-side coils or movable-side magnets that are placed correspondingly to stationary-side magnets or stationary-side coils in a linear motor arranged in an arc shape in perpendicular directions; a pressure sensor or a force sensor for measuring thrust of the linear motor; a perpendicular-side hydrostatic pad that holds the movable-side coils or the movable-side magnets at a fixed height, and that has an arc shape for causing it to move in a manner matched to a shape of the stationary-side magnets or the stationary-side coils in the arc shape; and a horizontal-side first hydrostatic plate and/or a horizontal-side first hydrostatic pad in a flat-plate shape that is placed on each of lateral sides of the movable unit;

and said stationary unit being provided with: a base on which the stationary-side magnets or the stationary-side coils in the linear motor, and a perpendicular-side hydrostatic plate having an arc shape that is opposite to the perpendicular-side hydrostatic pad, are placed; first and second walls on each of which a horizontal-side second hydrostatic pad and/or a horizontal-side second hydrostatic plate that is opposite to the horizontal-side first hydrostatic plate and/or the horizontal-side first hydrostatic pad, is placed; and a third wall to which an actuator coupled through a joint to the pressure sensor or the force sensor, for moving the movable unit in a movement direction thereof, and a position sensor for measuring a position of the movable unit, are attached.

Effect of the Invention

According to this application, since the movable unit and the stationary unit are provided with the hydrostatic pads and the hydrostatic plates that are opposite to each other and each have an arc shape, it becomes possible to precisely measure the cogging and the ripple of the linear motor arranged in an arc shape.

MODES FOR CARRYING OUT THE INVENTION

Embodiment 1

Figure 1:
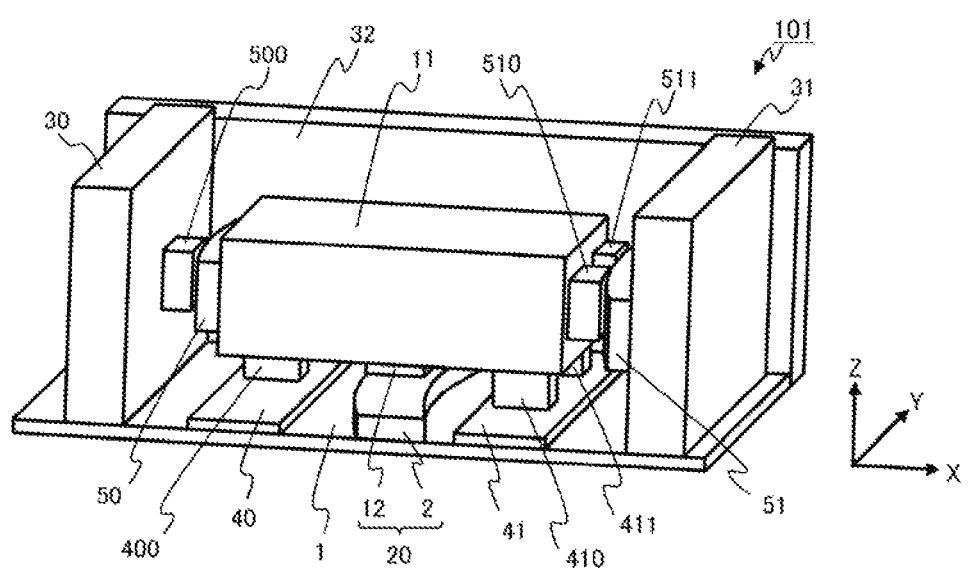
FIG. 1 is a front-side perspective view showing a configuration of a main part of a thrust measuring device according to Embodiment 1.
Figure 2:
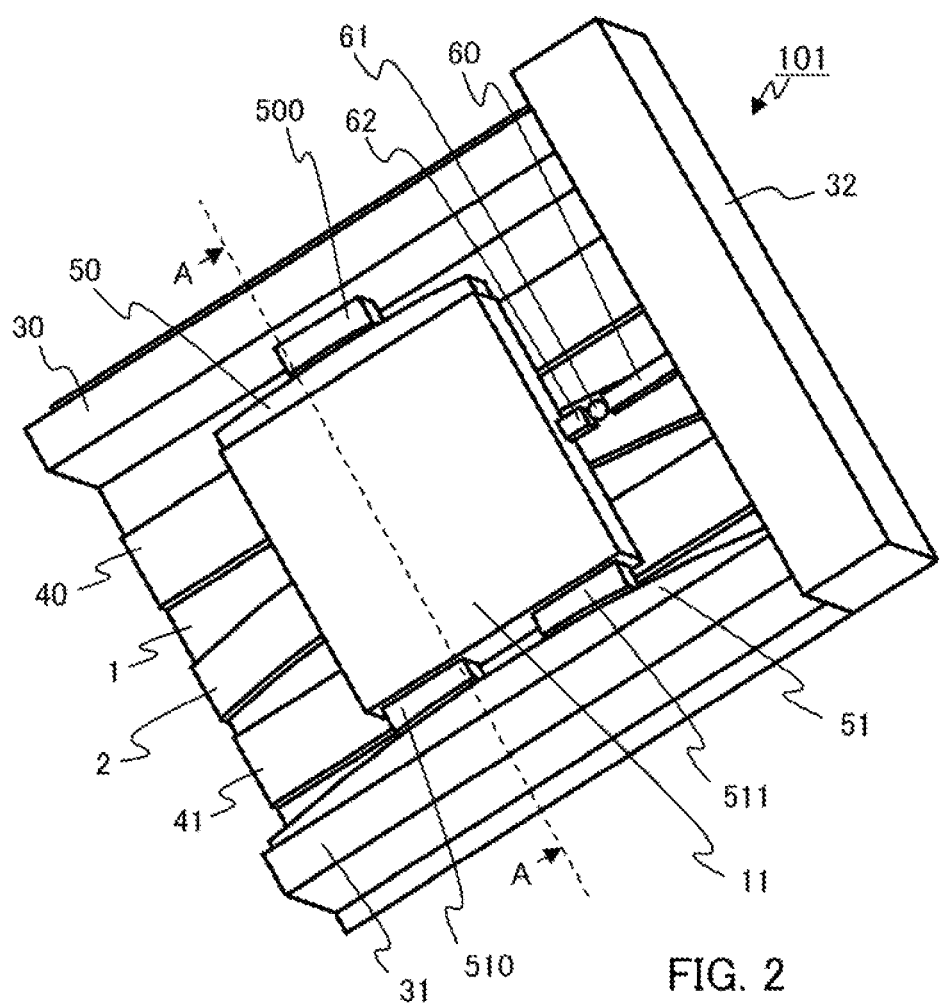
FIG. 2 is a top-side perspective view showing a configuration of the main part of the thrust measuring device according to Embodiment 1.
Figure 3:
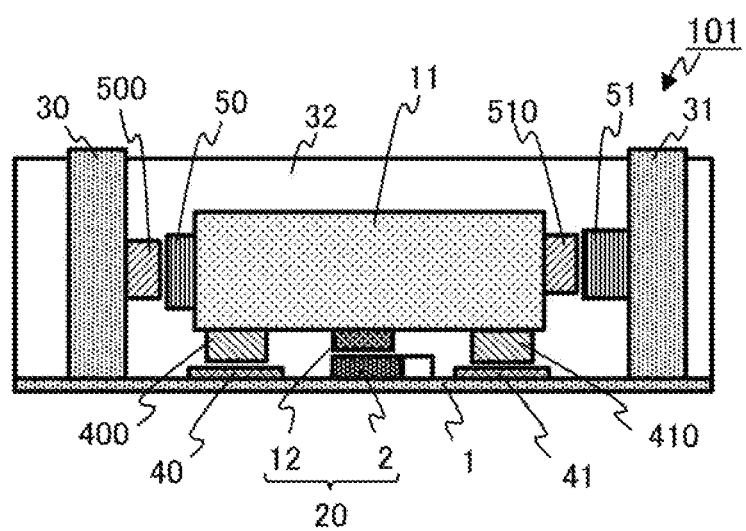
FIG. 3 is a cross-sectional view showing a configuration of the main part of the thrust measuring device according to Embodiment 1.

FIG. 1 is a perspective view showing an approximate configuration of a thrust measuring device 101 according to Embodiment 1 as viewed from the front side thereof, and FIG. 2 is a perspective view showing an approximate configuration of that device as viewed from the top side thereof. Further, FIG. 3 is a sectional view taken along a line indicated by arrows A, A in FIG. 2. Note that piping and wiring arrangement is not shown in these figures.

As shown in FIG. 1, FIG. 2 and FIG. 3, the thrust measuring device 101 is configured with: a stationary unit which comprises a base 1, magnets 2 as stationary-side magnets, perpendicular-side hydrostatic plates 40 and 41, a wall 30 as a first wall, a wall 31 as a second wall, a wall 32 as a third wall, a horizontal-side hydrostatic plate 51 as a horizontal-side second hydrostatic plate, and a horizontal-side pad 500 as a horizontal-side second hydrostatic pad; and a movable unit which comprises a movable base 11, coils 12 as movable-side coils, perpendicular-side hydrostatic pads 400, 410 and 411, a horizontal-side hydrostatic plate 50 as a horizontal-side first hydrostatic plate, and horizontal-side hydrostatic pads 510 and 511 as horizontal-side first hydrostatic pads.

Here, for sake of description, the movement direction of a linear motor 20 is defined as a Y-axis, an axis that is orthogonal to the Y-axis and that forms, together with the Y-axis, a placement plane for the linear motor 20 is defined as an X-axis, and an axis that is orthogonal to a plane formed by the X-axis and the Y-axis (hereinafter, this plane is referred to as an X-Y plane) is defined as a Z-axis. Further, a plane formed by the X-axis and the Z-axis is referred to as an X-Z plane. Coordinate axes based on these definitions are shown in FIG. 1.

In the stationary unit, the base 1 that is a configuration element of the linear motor 20 subject to measurement and that forms an X-Y plane is placed, and on this base 1, the magnets 2 in the linear motor 20 subject to measurement is arranged in a direction of the Y-axis and in an arc shape centering on the Z-axis. Further, on both sides of the magnets 2, the perpendicular-side hydrostatic plate 40 and the perpendicular-side hydrostatic plate 41 are placed in the Y-axis direction. Here, the perpendicular-side hydrostatic plate 40 and the perpendicular-side hydrostatic plate 41 each constitute an X-Y plane. Further, there are placed the wall 30, the wall 31 and the wall 32 whose positions are fixed relative to the base 1. The wall 30 and the wall 31 each constitute a Y-Z plane, and the wall 32 constitutes an X-Z plane. On the wall 30 and the wall 31, in order to allow the movable base 11 to be moved in a manner matched to the magnets 2 arranged in the arc shape, the horizontal-side hydrostatic pad 500 whose surface in contact with the movable base 11-side has a concave arc shape and the horizontal-side hydrostatic plate 51 whose surface in contact therewith has a convex arc shape, are placed, respectively. Further, an actuator 60 is mounted on the wall 32, and the actuator 60 is coupled through a ball joint 61 to a pressure sensor 62 attached to the movable base 11. Further, an encoder as a position sensor is built in the actuator 60, so that the position of the movable base 11 can be acquired.

In the movable unit, the coils 12 are placed centrally on the lower surface of the movable base 11 corresponding to an X-Y plane. Further, on both sides of the coils 12, the perpendicular-side hydrostatic pad 400 and the perpendicular-side hydrostatic pad 410 and perpendicular-side hydrostatic pad 411 are placed. Further, on both lateral sides of the movable base 11 each corresponding to a Y-Z plane, in order to allow the movable base 11 to be moved in a manner matched to the magnets 2 arranged in the arc shape, the horizontal-side hydrostatic plate 50 whose surface in contact with the wall 30-side has a convex arc shape and the horizontal-side hydrostatic pads 510, 511 whose surfaces in contact with the wall 31-side have concave arc shapes, are placed, respectively. On a lateral side of the movable base 11 corresponding to an X-Z plane, the pressure sensor 62 is attached and, as mentioned above, the pressure sensor 62 is coupled to the actuator 60 through the ball joint 61.

The thus-configured movable unit is placed at a position relative to the stationary unit at which the perpendicular-side hydrostatic pad 400 is faced with the perpendicular-side hydrostatic plate 40, the perpendicular-side hydrostatic pads 410, 411 are faced with the perpendicular-side hydrostatic plate 41, the horizontal-side hydrostatic plate 50 is faced with the horizontal-side hydrostatic pad 500, and the horizontal-side hydrostatic pads 510, 511 are faced with the horizontal-side hydrostatic plate 51.

The actuator 60 is a drive mechanism having a mechanism extensible in the Y-axis direction, and a ball screw mechanism is used as that mechanism, for example. As the pressure sensor 62, a load cell is used, for example. The reason why the ball joint 61 is used, is to allow the actuator 60 and the pressure sensor 62 to conform to a change in the relative angle therebetween, so that, other than the ball joint, a coupling mechanism may be used. Further, even though not shown in FIG. 1, an amplifier for supplying power is connected to the coils 12 through wires.

Figure 4:
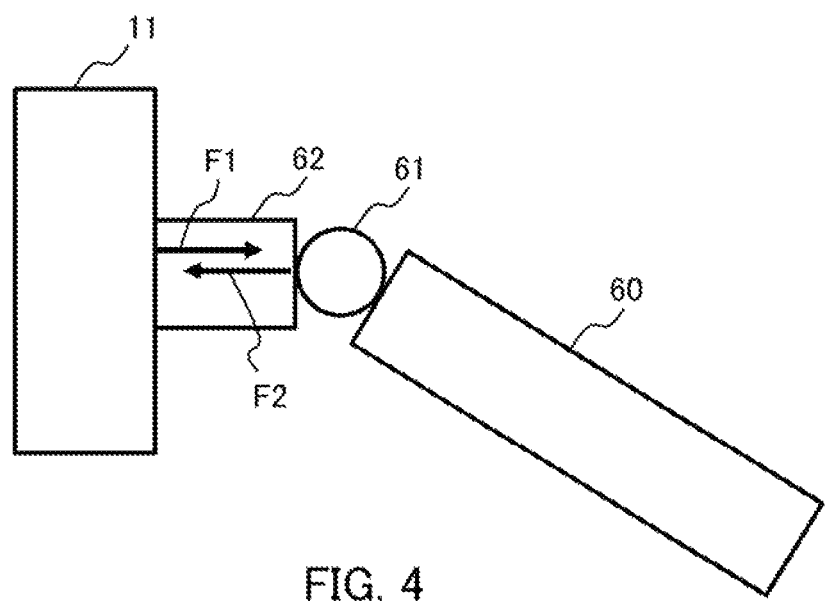
FIG. 4 is a diagram for illustrating an arrangement of a pressure sensor in the thrust measuring device according to Embodiment 1.
Figure 5:
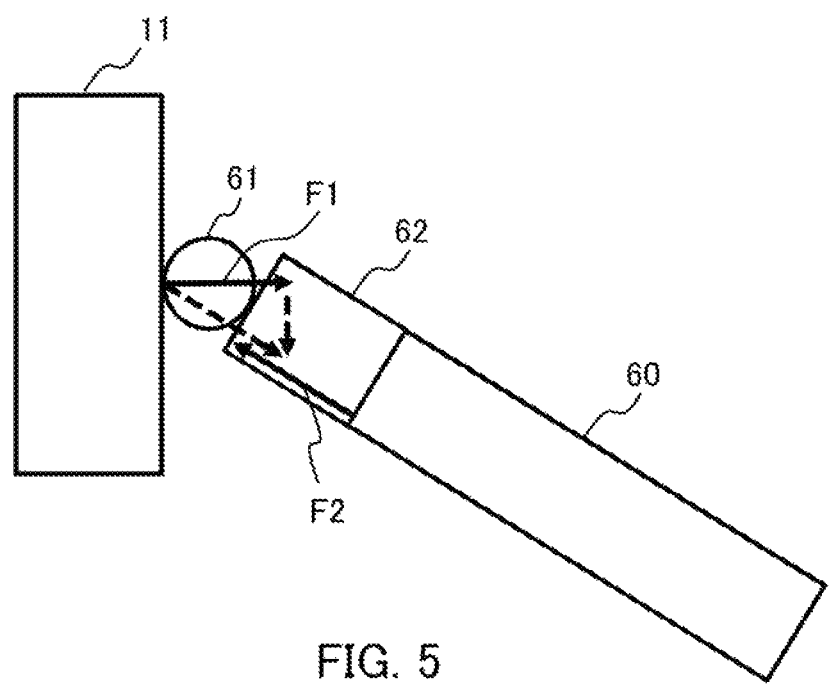
FIG. 5 is another diagram for illustrating an arrangement of a pressure sensor in the thrust measuring device according to Embodiment 1.

It is noted that such an arrangement is appropriate in which the pressure sensor 52 is provided on the leading end of the actuator 60 through the ball joint 61, and attached to the movable base 11. In this case, as shown in FIG. 4, even when the relative angle between the actuator 60 and the pressure sensor 62 has changed, a force that the pressure sensor 62 receives from the movable base 11 (a force F1 intended to be measured) and a reactive force that the sensor receives from the ball joint 61 (a measurable force F2) coincide with each other. In contrast, in the case of an arrangement in which the pressure sensor 62 is provided at the leading end of the actuator 60 and coupled to the movable base 11 through the ball joint 61, as shown in FIG. 5, when the relative angle between the actuator 60 and the pressure sensor 62 has changed, a difference appears between the force received from the movable base 11 through the ball joint 61 (the force F1 intended to be measured) and the reactive force received from the actuator 60 (the measurable force F2).

The perpendicular-side hydrostatic pads 400, 410, 411 and the horizontal-side hydrostatic pads 500, 510, 511 have functions of sending pressurized oil to their opposing perpendicular-side hydrostatic plates 40, 41 and horizontal-side hydrostatic plates 50, 51, respectively, to thereby form an oil film between the hydrostatic pad and the hydrostatic plate. The oil thickness between the hydrostatic pad and the hydrostatic plate is generally from 10 micrometers to 100 micrometers. Since the oil leaks out constantly from between the hydrostatic pad and the hydrostatic plate, the oil pressure is adjusted constantly by a hydraulic pump so that the pressure is always stable.

Figure 6:
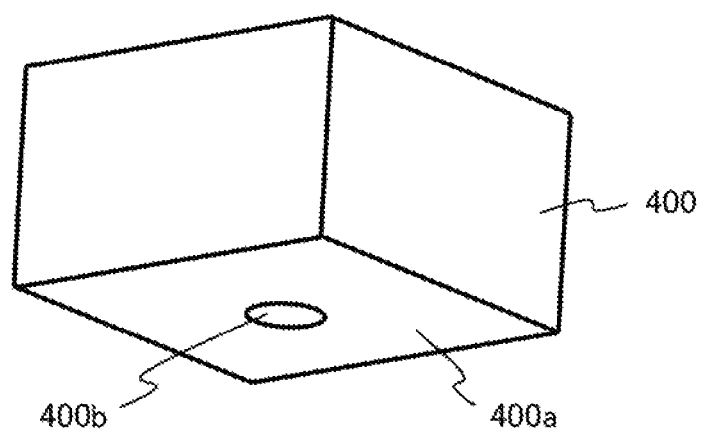
FIG. 6 is a perspective view showing a configuration of a perpendicular-direction hydrostatic pad in the thrust measuring device according to Embodiment 1.

FIG. 6 is a perspective view showing a basic configuration of the perpendicular-side hydrostatic pad 400. As shown in FIG. 6, the perpendicular-side hydrostatic pad 400 has a structure in which, at a center portion on its planar surface 400*a* that is opposite to the perpendicular-side hydrostatic plate 40, a hole 400*b* for discharging the oil is created, so that the oil will be discharged in between the perpendicular-side hydrostatic plate 40 and the perpendicular-side hydrostatic pad 400 through the hole 400*b*. Likewise, even though illustration is omitted here, the perpendicular-side hydrostatic pad 410 and the perpendicular-side hydrostatic pad 411 have similar structures in which, at center portions on their respective planar surfaces 410*a*, 411*a* that are opposite to the perpendicular-side hydrostatic plate 41, holes 410*b*, 411*b* for discharging the oil are created, respectively.

Figure 7:
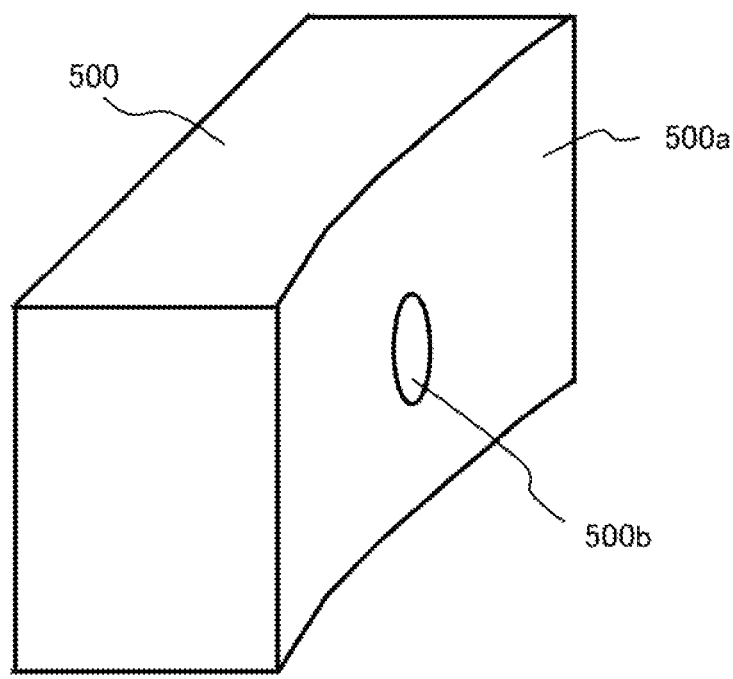
FIG. 7 is a perspective view showing a configuration of a horizontal-direction hydrostatic pad in the thrust measuring device according to Embodiment 1.

FIG. 7 is a perspective view showing a basic configuration of the horizontal-side hydrostatic pad 500. As shown in FIG. 7, the horizontal-side hydrostatic pad 500 also has a structure in which, at a center portion on its concave arc-shaped surface 500*a* that is opposite to the convex-shaped horizontal-side hydrostatic plate 50, a hole 500*b* for discharging the oil is created, so that the oil will be discharged in between the horizontal-side hydrostatic plate 50 and the horizontal-side hydrostatic pad 500 through the hole 500*b*. Likewise, even though illustration is omitted here, the horizontal-side hydrostatic pad 510 and the horizontal-side hydrostatic pad 511 have similar structures in which, at center portions on their respective concave arc-shaped surfaces 510*a*, 511*a* that are opposite to the convex-shaped horizontal-side hydrostatic plate 51, holes 510*b*, 511*b* for discharging the oil are created, respectively.

With respect to the horizontal-side hydrostatic pads 500, 510, 511, in order to allow the movable base 11 to be moved in a manner matched to the magnets 2 arranged in the arc shape, the horizontal-side hydrostatic pad 500 is provided with the concave arc-shaped surface 500*a* that is opposite to the convex-shaped horizontal hydrostatic plate 50, and the horizontal-side hydrostatic pads 510, 511 are provided with the concave arc-shaped surfaces 510*a*, 511*a* that are opposite to the convex-shaped horizontal-side hydrostatic plate 51, respectively.

The perpendicular-side hydrostatic plates 40, 41 and the horizontal-side hydrostatic plates 50, 51 are subject to forces of the oil sent from their opposing perpendicular-side hydrostatic pads 400, 410, 411 and opposing horizontal-side hydrostatic pads 500, 510, 511, respectively, and each have a mechanism for recovering the oil. Moreover, the perpendicular-side hydrostatic plates 40, 41 and the horizontal-side hydrostatic plates 50, 51 have functions as movement mechanisms by which their opposing perpendicular-side hydrostatic pads 400, 410, 411 and opposing horizontal-side hydrostatic pads 500, 510, 511 slide on the surfaces of the perpendicular-side hydrostatic plates 40, 41 and the horizontal-side hydrostatic plates 50, 51, respectively, through the oil sent from the opposing perpendicular-side hydrostatic pads 400, 410, 411 and opposing horizontal-side hydrostatic pads 500, 510, 511, respectively.

Figure 8:
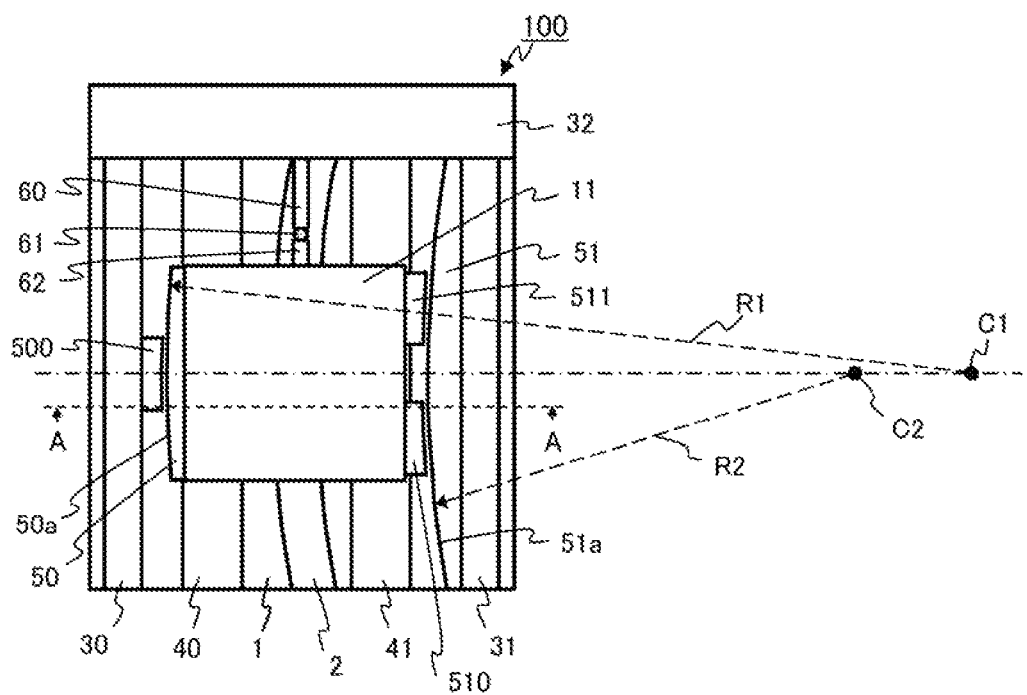
FIG. 8 is a top view showing a configuration of the main part of the thrust measuring device according to Embodiment 1.

FIG. 8 is a top view of the thrust measuring device 101, which is a diagram for illustrating in detail the shapes of the convex-shaped horizontal-side hydrostatic plate 50 and the convex-shaped horizontal-side hydrostatic plate 51. As shown in FIG. 8, the arc shape of a surface 50a of the convex-shaped horizontal-side hydrostatic plate 50 corresponds to a part of a circle with a radius R1 centering on a point C1. The concave arc-shaped surface 500a of the horizontal-side hydrostatic pad 500 is formed so as to be faced with the arc shape of the surface 50a of the convex-shaped horizontal-side hydrostatic plate 50.

Further, the arc shape of a surface 51a of the convex-shaped horizontal-side hydrostatic plate 51 corresponds to a part of a circle with a radius R2 centering on a point C2. The concave arc-shaped surfaces 510a, 511a of the horizontal-side hydrostatic pads 510, 511 are each formed so as to be faced with the arc shape of the surface 51a of the convex-shaped horizontal-side hydrostatic plate 51.

With this configuration, the perpendicular-side hydrostatic pads 400, 410, 411 and the horizontal-side hydrostatic pads 500, 510, 511 serve as guides by which very small coefficients of friction will be achieved for their opposing perpendicular-side hydrostatic plates 40, 41 and opposing horizontal-side hydrostatic plates 50, 51, respectively. The coefficient of friction is $1/20,000$ or less which is sufficiently smaller than the coefficient of friction of about $1/1000$ according to the general LM guide (Linear Motion Guide).

When the linear motor is a motor with core, namely, it has iron cores in the coils 12, a magnetic attractive force acts between the coils 12 and the magnets 2. Even though the magnetic attractive force depends on an ability of the linear motor, such as thrust or the like, in the case of a commercially available linear motor, the magnetic attractive force is exemplified as: 8,800 N when the continuous thrust is 960 N; 45,000 N when the continuous thrust is 3,000 N; and the like. The frictional force of the guide unit in each case is 8.8 N for the continuous thrust 960 N and 45 N for the continuous thrust 3,000 N, when an LM guide with a coefficient of friction of $1/1,000$ is employed.

In contrast, when a contactless guide with a coefficient of friction of $1/20,000$ is employed, the frictional force is 0.44 N for the continuous thrust 960 N and the frictional force is 2.25 N for the continuous thrust 3,000 N. The frictional force of the guide unit becomes an error factor in measuring the cogging. This is due to that the cogging-related thrust to be measured may reach a magnitude equivalent to that of the frictional force of the guide unit. Thus, the contactless guide that is smaller in coefficient of friction, namely, that is less influenced by the error factor in the measurement, is employed.

Figure 9:
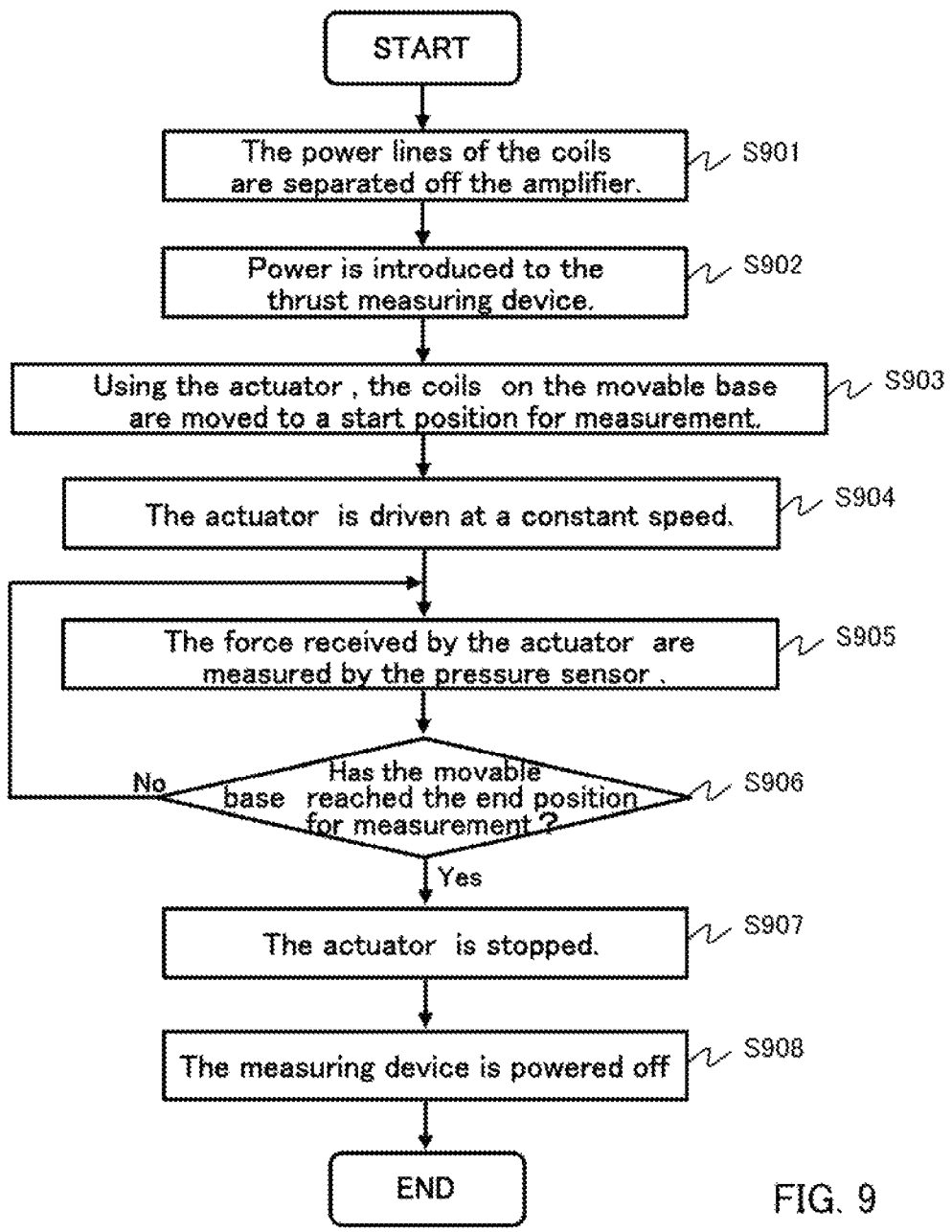
FIG. 9 is a flowchart showing how to measure cogging-related thrust by the thrust measuring device according to Embodiment 1.

Next, how the cogging-related thrust of the linear motor is measured using the thrust measuring device 101 according to Embodiment 1, will be described based on FIG. 9. FIG. 9 is a flowchart showing how to measure the cogging-related thrust by the thrust measuring device according to Embodiment 1.

The cogging-related thrust means thrust that is produced in the movement direction of the linear motor by the iron cores in the coils 12 under the influence of the magnets 2, and the direction of that trust is alternately reversed in accordance with the positional relationship between the iron cores and the magnets 2.

First, the power lines of the coils 12 are separated off the amplifier (Step S901). Then, power is introduced to the thrust measuring device 101 (Step S902). Thereafter, using the actuator 60, the coils 12 on the movable base 11 are moved to a start position for measurement (Step S903). This gets ready for measurement.

After getting ready, the actuator 60 is driven at a constant speed (Step S904). On this occasion, cogging-related thrust is produced in the coils 12 in the Y-axis direction in a manner depending on their relative position to the magnets 2. More specifically, the magnitude and direction of a force by which the iron core in the coil 12 is attracted to the magnet 2, differs from position to position, so that frontward and rearward forces are produced one after another in the movement direction.

The position of the movable base 11 and the force received by the actuator 60 from the movable base 11, during movement of the coils 12 at the constant speed, are measured by an encoder built in the actuator 60 and the pressure sensor 62, respectively (Step S905). Such measurement is repeated until the movable base 11 reaches an end position (Step S906 "No").

When the movable base 11 has reached the end position for measurement (Step S906 "Yes"), the actuator 60 is stopped (Step S907). Thereafter, the measuring device is powered off (Step S908), so that the measurement is completed. According to the above steps, it is possible to measure the cogging-related thrust.

Figure 10:
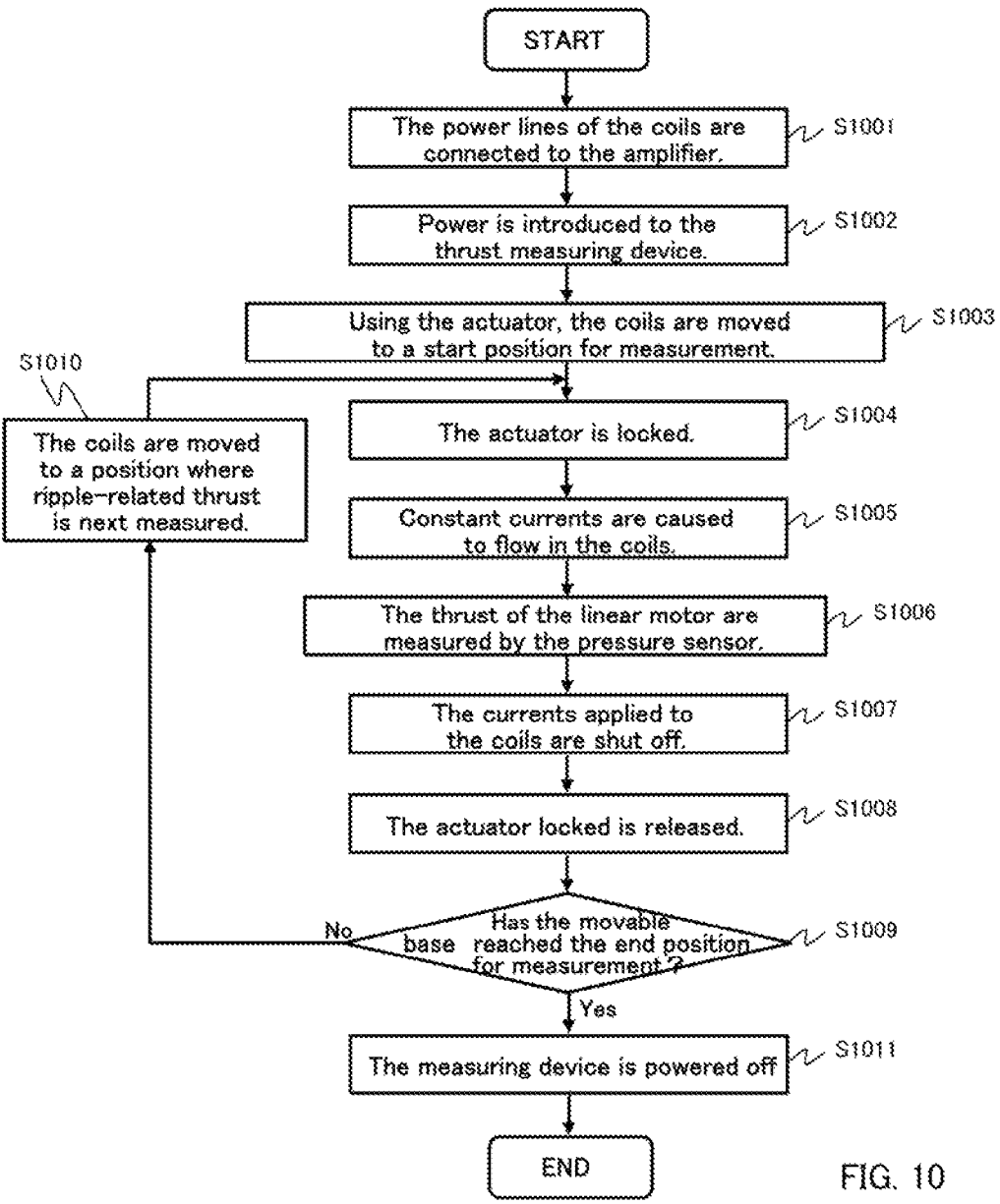
FIG. 10 is a flowchart showing how to measure ripple-related thrust by the thrust measuring device according to Embodiment 1.

Next, how the ripple-related thrust of the linear motor is measured using the thrust measuring device 101 according to Embodiment 1, will be described based on FIG. 10. FIG. 10 is a flowchart showing how to measure the ripple-related thrust by the thrust measuring device according to Embodiment 1.

The ripple-related thrust is represented by a phenomenon in which, even if the same currents are caused to flow in the coils 12, thrust differs depending on their relative position to the magnets 2.

First, the power lines of the coils 12 are connected to the amplifier (Step S1001). Then, power is introduced to the thrust measuring device 101 (Step S1002). After introduction of the power, using the actuator 60, the coils 12 on the movable base 11 are moved to a start position for measurement (Step S1003). After movement of the coils 12 to the start position for measurement, the actuator 60 is locked so as not to move from that position (Step S1004).

After locking the actuator 60, constant currents are caused to flow in the coils 12, so that thrust is produced in the linear motor (Step S1005). The position of the movable base 11 and the thrust of the linear motor, at this time, are measured by the encoder built in the actuator 60 and the pressure sensor 62, respectively (Step S1006).

After that measurement, the currents applied to the coils 12 are shut off (Step S1007). Thereafter, the actuator 60 locked is released (Step S1008). If the position is not an end position for measurement (Step S1009 "No"), the coils 12 are moved to a position where ripple-related thrust is next measured (Step S1010).

After that movement, according to the foregoing ways in Steps S1004 to S1009, the position of the movable base 11 and the thrust of the linear motor are measured by the encoder built in the actuator 60 and the pressure sensor 62, respectively. When the movable base 11 has reached the end position for measurement (Step S1009 "Yes"), the measuring device is powered off (Step S1011), so that the measurement is completed. According to the above steps, the relationship between the relative position of the coils 12 to the magnets 2 and the thrust, namely, the ripple-related thrust, is found.

Examples of a method of locking the actuator 60 include: a method in which the actuator 60 is subjected to position control after a desired position for measurement was set as the target value, namely, it is servo locked; and a method in which the actuator 60 is physically locked. By locking the actuator 60, it is possible for the actuator 60 not to move if thrust is applied thereto.

As described above, according to the thrust measuring device 101 according to Embodiment 1, it comprises: a movable unit and a stationary unit, said movable unit being provided with: the coils 12 placed correspondingly to the magnets 2 in the linear motor 20 arranged in an arc shape; the pressure sensor 62 for measuring thrust of the linear motor 20; the perpendicular-side hydrostatic pads 400, 410, 411 that hold the coils 12 at a fixed height; and the horizontal-side hydrostatic plate 50 and the horizontal-side hydrostatic pads 510, 511 having a convex arc shape and concave arc shapes, respectively, for causing them to move in a manner matched to the shape of the magnets 2 in an arc shape, and said stationary unit being provided with: the base 1 on which the magnets 2 in the linear motor 20 and the perpendicular-side hydrostatic plates 40, 41 that are opposite to the perpendicular-side hydrostatic pads 400, 410, 411, are placed; the wall 30 on which the horizontal-side hydrostatic pad 500 having a concave arc shape that is opposite to the horizontal-side hydrostatic plate 50, is placed; the wall 31 on which the horizontal-side hydrostatic plate 51 having a convex arc shape that is opposite to the horizontal-side hydrostatic pads 510, 511, is placed; and the wall 32 to which the actuator 60 coupled through the ball joint 61 to the pressure sensor 62, for moving the movable unit in the movement direction thereof (Y-axis direction) and for measuring the position of the movable unit, is attached. Thus, it becomes possible to precisely measure the cogging and the ripple of the linear motor arranged in an arc shape.

Further, a hole through which the oil is discharged is created in each of the perpendicular-side hydrostatic pads 400, 410, 411 and the horizontal-side hydrostatic pads 500, 510, 511, so that the perpendicular-side hydrostatic plates 40, 41 and the horizontal-side hydrostatic plates 50, 51 are each subject to a certain pressure by the oil discharged in between that plate and corresponding one of the perpendicular-side hydrostatic pads 400, 410, 411 and the horizontal-side hydrostatic pads 500, 510, 511, and each have a mechanism for recovering the oil. Thus, at the time of measuring the cogging-related thrust and the ripple-related thrust, it becomes possible, while reducing to the minimum the influence of the frictional force as an error factor by the guide unit, to measure the cogging-related thrust and the ripple-related thrust when the linear motor is driven arcuately.

It is noted that, in Embodiment 1, the coils 12 in the linear motor 20 are placed on the movable base 11 in the movable unit and the magnets 2 in the linear motor 20 are placed on the base 1 in the stationary unit; however, this is not limitative. Such a configuration may be employed in which the magnets 2 are attached to the movable base 11 and the coils 12 are attached to the base 1. With this configuration, in addition to the effect having been described in Embodiment 1, there is provided such an effect that the length of the magnets required for measurement is reduced.

Further, in Embodiment 1, there are used the horizontal-side hydrostatic plate 50 having a convex arc shape, the horizontal-side hydrostatic pads 510, 511 each having a concave arc shape, the horizontal-side hydrostatic pad 500 having a concave arc shape that is opposite to the horizontal-side hydrostatic plate 50, and the horizontal-side hydrostatic plate 51 having a convex arc shape that is opposite to the horizontal-side hydrostatic pads 510, 511; however, this is not limitative. With respect to the horizontal-side hydrostatic plate and the corresponding horizontal-side hydrostatic pad, they only have to have such convex and concave shapes in combination, and which one of them has the convex shape or the concave shape is of no matter. Thus, in addition to the effect having been described in Embodiment 1, there is provided such an effect that it becomes possible to make selection about them in conformity with the shape of the linear motor.

Further, the horizontal-side hydrostatic pads 500, 510, 511 and the horizontal-side hydrostatic plates 50, 51 may be configured to be replaceable. With this configuration, in addition to the effect having been described in Embodiment 1, there is provided such an effect that it becomes possible to freely change the radius of rotation for driving the linear motor.

Further, in Embodiment 1, the horizontal-side hydrostatic pads 500, 510, 511 and the horizontal-side hydrostatic plates 50, 51 are each in an arc shape; however, this is not limitative. It is allowable that the perpendicular-side hydrostatic pads 400, 410, 411 and the perpendicular-side hydrostatic plates 40, 41 are each in an arc shape, and the horizontal-side hydrostatic pads 500, 510, 511 and the horizontal-side hydrostatic plates 50, 51 are each in a planar shape. With this configuration, it becomes possible to precisely measure the cogging and the ripple of the linear motor arranged in an arc shape centering on the X-axis.

Meanwhile, this invention is applicable to a thrust producing device other than the linear motor, for example, a device that produces thrust without using a magnetic force, such as an electrostatic linear motor or the like. In the case of a device that produces thrust by itself, the magnets 2 are not required to be attached. Accordingly, the effect having been described in Embodiment 1 will be achieved also by such a thrust measuring device for other than a linear motor.

Further, in Embodiment 1, such a case has been described where an oil-based hydrostatic bearing is used as each guide; however, this is not limitative. A contactless guide of a magnetic type may instead be used. Further, in the description, six hydrostatic pads in total are used; however, the device is operable if the number is less than six, or more than six. Further, a force sensor may be used instead of the pressure sensor, and a linear scale encoder may be used instead of the encoder as the position sensor built in the actuator 60.

Embodiment 2

In Embodiment 1, the pressure sensor 62 is configured to be provided on an end of the actuator 60 through the ball joint 61 and attached to the movable base 11, whereas, in Embodiment 2, a case will be described where a 3-axis pressure sensor is provided on the other end of the actuator.

Figure 11:
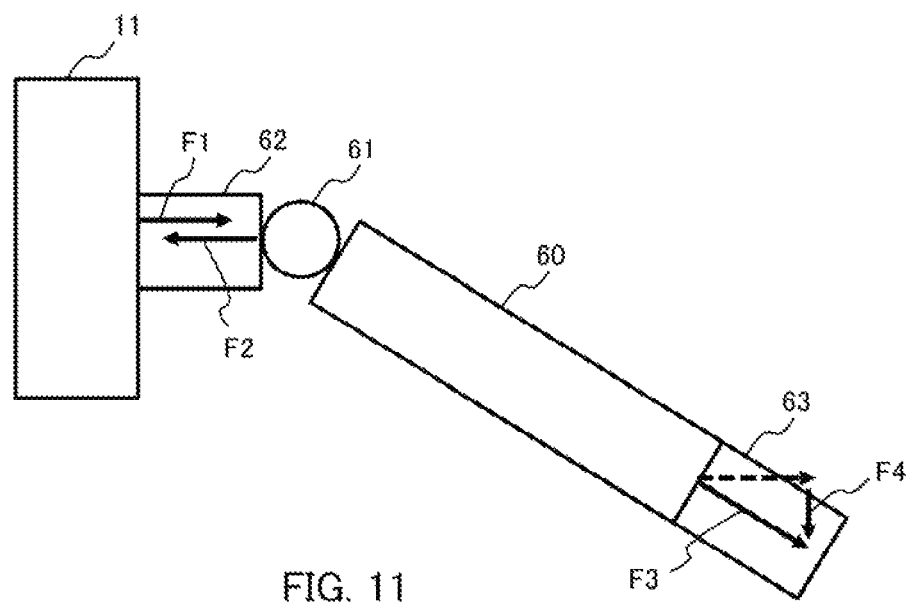
FIG. 11 is a diagram for illustrating an arrangement of a pressure sensor in a thrust measuring device according to Embodiment 2.

As shown in FIG. 11, in Embodiment 2, in addition to the pressure sensor 62 provided on the end of the actuator 60 through the ball joint 61 as shown in FIG. 4 of Embodiment 1, a 3-axis pressure sensor 63 is provided on the other end of the actuator 60 toward the stationary side. The other configuration of the thrust measuring device according to Embodiment 2 is similar to that in the thrust measuring device 101 of Embodiment 1, so that the same numerals are given to the corresponding parts, and description thereof will be omitted.

With this configuration, the force F1 intended to be measured can be measured as the force F2 measurable by the pressure sensor 62 and from forces F3 and F4 measurable by the 3-axis pressure sensor 63. Here, it becomes possible to calculate a relative angle between the movable base 11 and the actuator 60 from a ratio among the forces F2, F3 and F4.

The relative angle between the movable base 11 and the actuator 60 is to be determined depending on the arc shapes of the horizontal-side hydrostatic plates 50, 51, so that, with the configuration of this embodiment, it becomes possible to determine, through calculation based on the above relative angle, a distance from the movable base 11 to a stationary side, for example, the wall 32, namely, a moved distance of the movable base 11, and a driven speed thereof.

As described above, according to the thrust measuring device according to Embodiment 2, since the stationary unit is provided with the actuator 60 through the 3-axis pressure sensor 63, it becomes possible to calculate the relative angle between the movable base and the actuator, and thus the distance from the movable base to a stationary side, for example, the wall, namely, the moved distance of the movable base and the driven speed thereof, can be determined through calculation.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the description of this application. For example, such cases shall be included where at least one configuration element is modified; where any configuration element is added or omitted; and furthermore, where at least one configuration element is extracted and combined with a configuration element of another embodiment.

DESCRIPTION OF REFERENCE NUMERALS AND SIGNS

1:base, 2:magnets, 11:movable base, 12: coils, 20: linear motor, 30: wall (first wall), 31: wall (second wall), 32: wall (third wall), 40, 41: perpendicular-side hydrostatic plate, 50: horizontal-side hydrostatic plate (horizontal-side first hydrostatic plate), 51: horizontal-side hydrostatic plate (horizontal-side second hydrostatic plate), 60: actuator, 61: ball joint, 62: pressure sensor, 101: thrust measuring device, 400, 410, 411: perpendicular-side hydrostatic pad, 500: horizontal-side hydrostatic pad (horizontal-side second hydrostatic pad), 510, 511: horizontal-side hydrostatic pad (horizontal-side first hydrostatic pad).

The invention claimed is:

1. A thrust measuring device, comprising a movabler and a stationaror,
  said movabler being provided with:
  movable-side coils or movable-side magnets that are placed correspondingly to stationary-side magnets or stationary-side coils in a linear motor formed in an arc shape;
  a pressure sensor or a force sensor for measuring thrust of the linear motor; and
  a first hydrostatic plate and/or a first hydrostatic pad caused to move in a manner matched to a shape of the stationary-side magnets or the stationary-side coils,
  and said stationaror being provided with:
  the stationary-side magnets or the stationary-side coils in the linear motor;
  a second hydrostatic pad and/or a second hydrostatic plate that is opposite to the first hydrostatic plate and/or the first hydrostatic pad;
  an actuator coupled through a joint to the pressure sensor or the force sensor, for moving the movabler in a movement direction thereof; and
  a position sensor for measuring a position of the movabler.

2. The thrust measuring device according to claim 1, wherein, when it is provided with the first hydrostatic pad and/or the second hydrostatic pad, a hole through which oil is discharged is created in each of the first hydrostatic pad and/or the second hydrostatic pad, and each of the first hydrostatic plate and/or the second hydrostatic plate is subject to a certain pressure by the oil discharged in between said plate and each of the first hydrostatic pad and/or the second hydrostatic pad, and has a mechanism for recovering the oil.

3. The thrust measuring device according to claim 2, wherein the stationaror is provided with the actuator through a 3-axis pressure sensor.

4. The thrust measuring device according to claim 1, wherein the stationaror is provided with the actuator through a 3-axis pressure sensor.

5. The thrust measuring device according to claim 4, wherein the stationaror is provided with the actuator through a 3-axis pressure sensor.

6. A thrust measuring device, comprising a movabler and a stationaror,
  said movabler being provided with:
  movable-side coils or movable-side magnets that are placed correspondingly to stationary-side magnets or stationary-side coils in a linear motor formed in an arc shape in horizontal directions;
  a pressure sensor or a force sensor for measuring thrust of the linear motor;
  a perpendicular-side first hydrostatic pad that holds the movable-side magnets or the movable-side coils at a fixed height;
  a horizontal-side first hydrostatic plate and/or a horizontal-side first hydrostatic pad that is placed on each of lateral sides of the movabler and has an arc shape for causing it to move in a manner matched to a shape of the stationary-side magnets or the stationary-side coils,
  and said stationaror being provided with:
  a base on which the stationary-side magnets or the stationary-side coils in the linear motor, and a perpendicular-side first hydrostatic plate in a flat-plate shape, that is opposite to the perpendicular-side first hydrostatic pad, are placed;
  first and second walls on each of which a horizontal-side second hydrostatic pad and/or a horizontal-side second hydrostatic plate having an arc shape that is opposite to the horizontal-side first hydrostatic plate and/or the horizontal-side first hydrostatic pad, is placed; and a third wall to which an actuator coupled through a joint to the pressure sensor or the force sensor, for moving the movabler in a movement direction thereof, and a position sensor for measuring a position of the movabler, are attached.

7. The thrust measuring device according to claim 6, wherein the horizontal-side first hydrostatic pad, the horizontal-side first hydrostatic plate, the horizontal-side second hydrostatic pad and the horizontal-side second hydrostatic plate, are each replaceable.

8. The thrust measuring device according to claim 7, wherein, when it is provided with the first hydrostatic pad and/or the second hydrostatic pad, a hole through which oil is discharged is created in each of the first hydrostatic pad and/or the second hydrostatic pad, and each of the first hydrostatic plate and/or the second hydrostatic plate is subject to a certain pressure by the oil discharged in between said plate and each of the first hydrostatic pad and/or the second hydrostatic pad, and has a mechanism for recovering the oil.

9. The thrust measuring device according to claim 8, wherein the stationaror is provided with the actuator through a 3-axis pressure sensor.

10. The thrust measuring device according to claim 7, wherein the stationaror is provided with the actuator through a 3-axis pressure sensor.

11. The thrust measuring device according to claim 6, wherein, when it is provided with the first hydrostatic pad and/or the second hydrostatic pad, a hole through which oil is discharged is created in each of the first hydrostatic pad and/or the second hydrostatic pad, and each of the first hydrostatic plate and/or the second hydrostatic plate is subject to a certain pressure by the oil discharged in between said plate and each of the first hydrostatic pad and/or the second hydrostatic pad, and has a mechanism for recovering the oil.

12. The thrust measuring device according to claim 11, wherein the stationaror is provided with the actuator through a 3-axis pressure sensor.

13. The thrust measuring device according to claim 6, wherein the stationaror is provided with the actuator through a 3-axis pressure sensor.

14. A thrust measuring device, comprising a movabler and a stationaror,
said movabler being provided with:
movable-side coils or movable-side magnets that are placed correspondingly to stationary-side magnets or stationary-side coils in a linear motor arranged in an arc shape in perpendicular directions;
a pressure sensor or a force sensor for measuring thrust of the linear motor;
a perpendicular-side first hydrostatic pad that holds the movable-side coils or the movable-side magnets at a fixed height, and that has an arc shape for causing it to move in a manner matched to a shape of the stationary-side magnets or the stationary-side coils in the arc shape; and
a horizontal-side first hydrostatic plate and/or a horizontal-side first hydrostatic pad in a flat-plate shape that is placed on each of lateral sides of the movabler;
and said stationaror being provided with:
a base on which the stationary-side magnets or the stationary-side coils in the linear motor, and a perpendicular-side first hydrostatic plate having an arc shape that is opposite to the perpendicular-side first hydrostatic pad, are placed;
first and second walls on each of which a horizontal-side second hydrostatic pad and/or a horizontal-side second hydrostatic plate that is opposite to the horizontal-side first hydrostatic plate and/or the horizontal-side first hydrostatic pad, is placed; and
a third wall to which an actuator coupled through a joint to the pressure sensor or the force sensor, for moving the movabler in a movement direction thereof, and a position sensor for measuring a position of the movabler, are attached.

15. The thrust measuring device according to claim 14, wherein the perpendicular-side first hydrostatic pad and the perpendicular-side first hydrostatic plate are each replaceable.

16. The thrust measuring device according to claim 15, wherein, when it is provided with the first hydrostatic pad and/or the second hydrostatic pad, a hole through which oil is discharged is created in each of the first hydrostatic pad and/or the second hydrostatic pad, and each of the first hydrostatic plate and/or the second hydrostatic plate is subject to a certain pressure by the oil discharged in between said plate and each of the first hydrostatic pad and/or the second hydrostatic pad, and has a mechanism for recovering the oil.

17. The thrust measuring device according to claim 15, wherein the stationaror is provided with the actuator through a 3-axis pressure sensor.

18. The thrust measuring device according to claim 14, wherein, when it is provided with the first hydrostatic pad and/or the second hydrostatic pad, a hole through which oil is discharged is created in each of the first hydrostatic pad and/or the second hydrostatic pad, and each of the first hydrostatic plate and/or the second hydrostatic plate is subject to a certain pressure by the oil discharged in between said plate and each of the first hydrostatic pad and/or the second hydrostatic pad, and has a mechanism for recovering the oil.

19. The thrust measuring device according to claim 18, wherein the stationaror is provided with the actuator through a 3-axis pressure sensor.

20. The thrust measuring device according to claim 14, wherein the stationaror is provided with the actuator through a 3-axis pressure sensor.

* * * * *